Nov. 26, 1957  F. E. NICKEL  2,814,546
RECORDING SYSTEM FOR RADIO DIRECTION FINDING EQUIPMENT
Filed Aug. 25, 1952  2 Sheets-Sheet 1
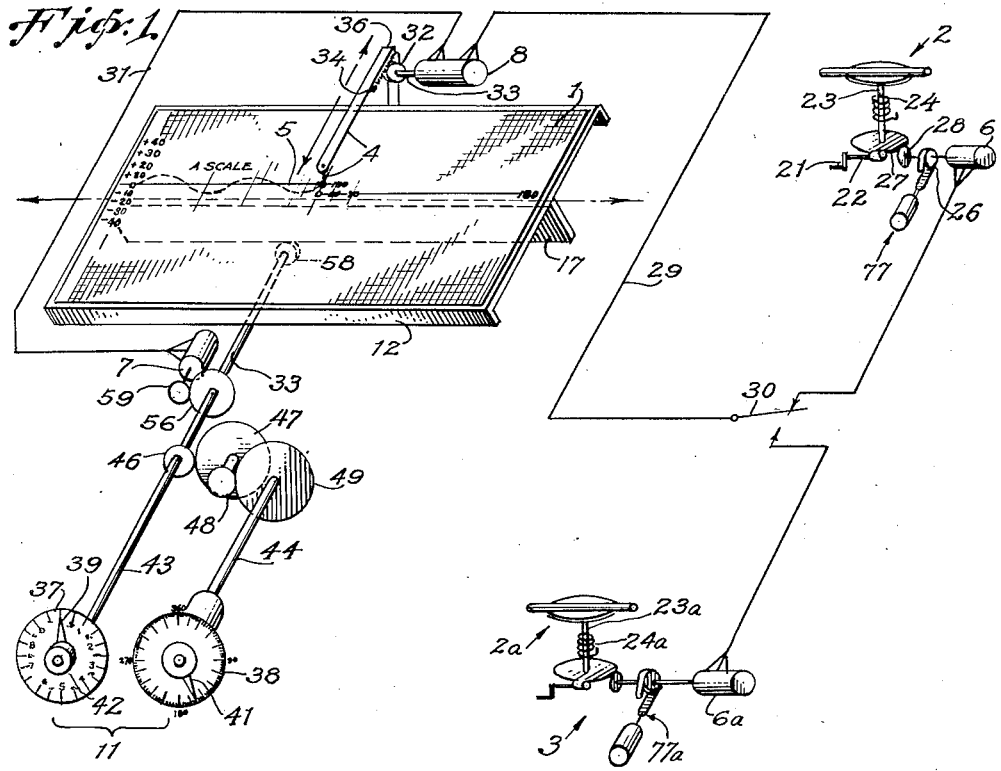
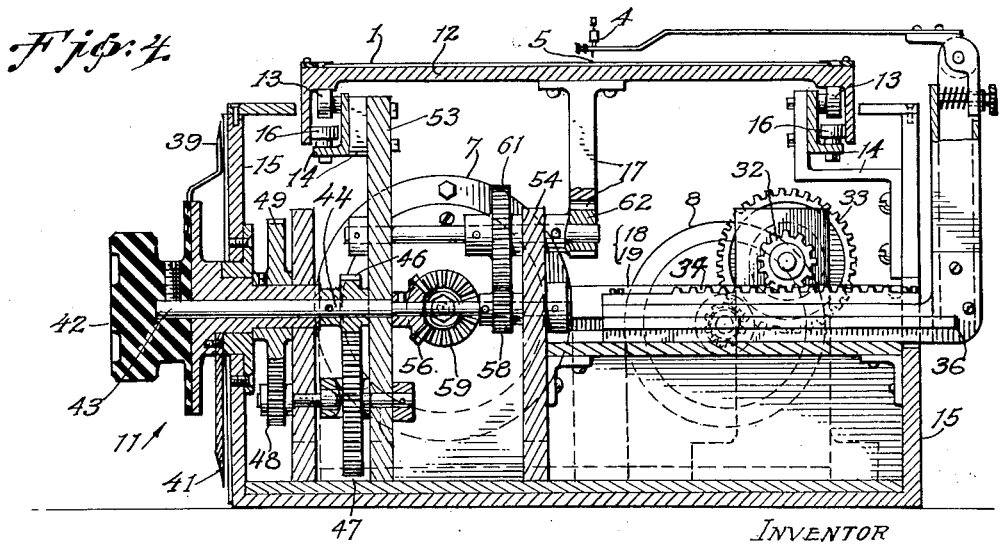
INVENTOR
FRED E. NICKEL
BY
ATTORNEYS Nov. 26, 1957      F. E. NICKEL      2,814,546
RECORDING SYSTEM FOR RADIO DIRECTION FINDING EQUIPMENT
Filed Aug. 25, 1952      2 Sheets-Sheet 2
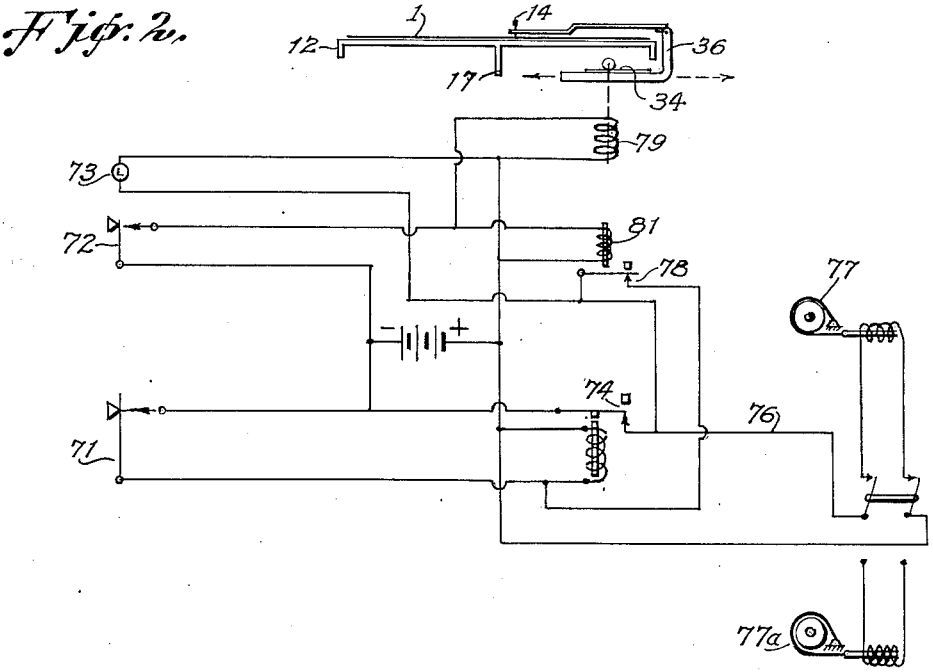
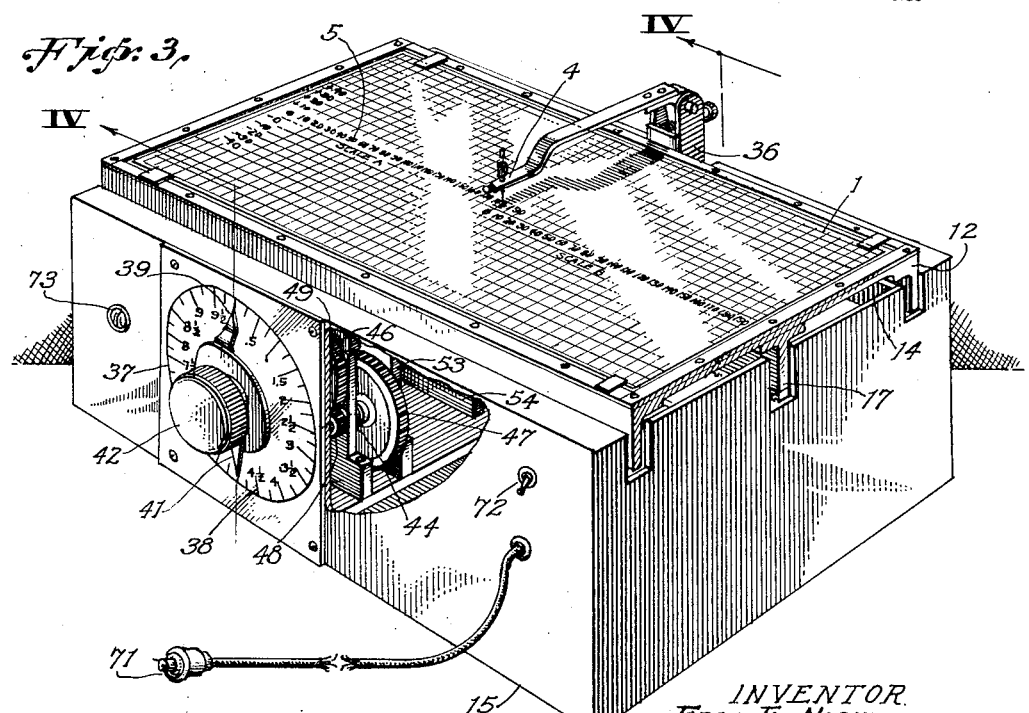
INVENTOR.
FRED E. NICKEL

2,814,546
RECORDING SYSTEM FOR RADIO DIRECTION FINDING EQUIPMENT

Fred E. Nickel, San Diego, Calif.

Application August 25, 1952, Serial No. 306,314

6 Claims. (Cl. 346—8)

(Granted under Title 35, U. S. Code (1952), sec. 266)

This invention relates to computing and recording instruments and, more specifically to a method of and apparatus for determining and recording on calibration charts deviations in shipboard radio direction finding equipment.

The described invention may be manufactured and used by and for the Government of the United States of America for governmental purposes without payment of any royalties thereon or therefor.

It is a known fact that relative bearings obtained by shipboard radio direction finders (RDF) seldom are correct even though maximum precautions are taken in designing and employing identical installations on ships of identical types. Relatively small changes in a given ship's structure cause material RDF deviations, and such temporary conditions as broken or faulty insulations, guy wire bonding, metallic paints, or even the movement of loading booms also may cause such deviation as to render RDF ineffective for navigational purposes unless the equipment is carefully and accurately calibrated and correction factors obtained for the entire RDF frequency band.

In prior practices, such calibrations were tedious and lengthy, often requiring from thirty minutes to an hour for each frequency. In addition, the accuracy of the results obtained usually were questionable because, for one reason, time was not available to check and then recheck by reverse runs all frequencies guarded and, if such was not done, the correction factors obtained were unreliable. Further, due to the excessive time required and the inadvisability of typing-up the ship for such a time, a check of all frequencies seldom was performed.

The fundamental difficulty in, or objection to, prior procedures lay in its reliance upon the skill and the care which had to be exercised by its operators, as well as its need for close intercommunications and coordination between the operators if accurate comparative data was to be obtained. For instance, any abnormal deviations obviously had to be checked very thoroughly to determine whether or not they actually existed or, perhaps, were due to human error and such checking entailed much unnecessary time, trouble and expense since the ship had to be swung through the same questionable relative bearing a second or third time. But if such checks were not made, the data obtained not only was not reliable but was, in fact, dangerous. Further the possibility of error was very much increased by the difficulty in coordinating the visual and RDF operators so that their readings were taken at the same instant and such could be accomplished only through close communication and precise teamwork which if not present resulted in data that was not truly comparative.

It is, therefore, an object of the present invention to provide a method and apparatus for expeditiously and accurately obtaining and recording differences between data or readings obtained by separate means from a single source, such as data obtained by both visual and RDF means from a single transmitting visual target.

A related object is to eliminate as far as possible, the element of human error present in RDF calibrating practices.

A further object is to provide apparatus in accordance with the above objects which is relatively compact, simple, inexpensive and easily and conveniently set-up and operated by a minimum of skilled operators.

Still another object is to make possible a minimum of intercommunication in RDF calibrating runs and, by accomplishing this, to minimize the possibility of error arising because of incorrect timing or misunderstandings in such communications.

Considered in its broaded aspects, the present invention is based upon a general scheme of obtaining and recording such comparative data by providing means not only for receiving and computing the difference between transmissions of the data, but also capable of and adapted to actuate a recording stylus that is moveable with respect to a data sheet in conforming with computations made. In the preferred form of the apparatus, the data sheet is so positioned with respect to the stylus that the recordings are made on desired indices of the sheet. Thus, in RDF calibrating work, the data sheets are marked off with polar or rectilinear coordinates designating bearings and bearing corrections, and the sheet is so moved that the bearing correction, which is the differential computation, is marked on the particular bearing under question. Most suitably, the data sheet movement is synchronized with energizing transmissions issuing from and controlled in accordance with data obtained from one of the data sources.

Considering in a general manner the more specific apparatus used, the data is obtained simultaneously by visual means (polariscope) and by radio transmissions from a single target, the data then being transmitted by self-synchronous generators to a differential motor that synchronously drives the stylus amounts proportional to the RDF deviations. The stylus is moveable with respect to a plotting board that is marked off with such appropriate coordinate indices as bearings, plus and minus correction factors, and a zero reference line for the plus and minus factors. In addition, the board itself is independently moveable to position the RDF bearing to be checked in alignment with the stylus; this alignment then permitting the stylus to move along and record on the bearing a plus or minus correction factor that is computed by the stylus moving differential motor. To permit this, it has been found most suitable to move the board in synchronism with the data imposed upon the selsyn generator that transmits the RDF bearing data to the differential motor.

In its operation, the RDF and the visual equipment both continuously follow their targets and transmit data to the differential motor, but means are provided for permitting the RDF operator to control the generator that is transmitting the visual data so that, when the RDF operator is trained on a bearing to be checked, manual operation of this means arrests the visual data generator and maintains it in a fixed position in which it must transmit that particular signal that was emanating at the time that this arresting means was actuated. With such an arrngement, the only skill required to obtain accurate calibration data is that exercised by the RDF operator in arresting the visual data generator when the RDF is on target. The visual operator need only maintain the target in his sights to ensure accuracy and, as may be gathered, the general system eliminates any necessity for communication between the visual and the RDF operators, except such as may be needed to institute and occasionally coordinate the calibrating runs. In fact, it is practical and desirable to provide a motor to drive the visual direction finder in synchronism with the RDF equipment, such a motor completing most of the functions of the visual operator.

Other more detailed provisions of this invention include mechanical drives and electric circuitry both of which serve to further eliminate possible error, but, in evaluating this invention it should be borne in mind that although these elements, as well as those previously discussed, all are specifically adapted for RDF calibration technique, the method and apparatus may be used for other similar purposes, and it presently is intended to include in the scope of the invention all uses and adaptions which are reasonably manifest. As may readily be appreciated, the apparatus described easily could be adapted for comparing radar and sonar, radar and visual, or any bearing or other data in which a single source, or target, is recognizable by the data-receiving equipment being checked.

The preferred embodiment of the invention is illustrated in the accompanying drawings of which Fig. 1 is a diagrammatic view showing the apparatus combined with suitable schematic electrical operating circuits; Fig. 2 an electrical diagram showing additional details of the operating circuits; Fig. 3 a top perspective of the apparatus, and Fig. 4 a vertical section taken along lines IV—IV of Figure 3, this figure illustrating, in somewhat simplified manner, the drives for the various moving parts of the apparatus.

In describing the invention, the general and somewhat functional aspects of the elements illustrated schematically in Fig. 1 first will be considered, following which such relevant structural and electrical details as are essential to a full understanding will be set forth.

Referring to Fig. 1, the whole purpose of this particular arrangement is to plot on chart 1 a curve representative of correction data for calibrating radio direction finding equipment (not shown), this data being obtained by differentially comparing relative bearings obtained from the RDF with visually-correct relative bearings obtained from visual sighting telescopes, such as scopes 2 or 2a that may be used selectively as convenience dictates.

As may be noted, plot or chart 1 is marked off with rectilinear coordinates, the axis of the abscissa being divided into relative bearing indices and the axis of the ordinate into plus and minus R. D. F. correction factor values measured from a zero reference line 5. Preferably, the data sheet has twenty lines to an inch, each line representing one degree relative bearing, or azimuth, so that the ordinate correction factors can be directly added to or subtracted from the relative bearing of the abscissa to provide by easy reference a corrected and true relative bearing; the arrangement being such that the correction values are recorded by means of a stylus 4 directly on an abscissa bearing which represents the bearing of the RDF.

To accomplish this, data sheet 1 is mounted in such a manner as to be moveable in a synchronous relationship with the RDF operations, so that when the RDF is trained on a desired target bearing, the data sheet is moveable to present that bearing to the stylus, thereby permitting the correction factor to be recorded directly on that bearing.

Another feature of the invention is the manner in which this correction factor is obtained and stylus 4 moved so as to permit a recording of this correction factor on the bearing that has been aligned with it. Generally, the correction factor is obtained by providing a pair of selsyn generators 6 and 7, one of which (generator 6) is disposed near and operated in accordance with relative bearing data obtained from telescopes 2 and 2a, while the other (generator 7) is mounted in proximity to and controllable in a manner to be described by relative bearing data obtained from the RDF. Both of the generators, in turn, are electrically connected to separate sets of coils of a differential selsyn motor 8 which has a gear-rack driving connection with the arm of stylus 4, so that the data obtained at both the visual and the RDF sources can be transmitted by generated signals to energize motor 8 and move its shaft and stylus 4 a distance which is commensurate with the difference between the transmitted signals. As may be surmised, the arrangement is such that the stylus normally lies over zero line 5 of the plot and is moved by motor 8 from this zero position only when there is a difference between the signal strength of the RDF and visual generations, which difference energizes one of the motor coils to a greater or lesser extent than the other. Since the setting and signal strength of visual bearing generator 6 always is the same for any bearing, any movement of stylus 4 is wholly representative of variations in the RDF bearings from the visual bearings. Also, the movement of stylus 4 may be controlled by gearing so as to produce a movement representative of one degree for each degree variation in the respective bearings, although if desired suitable servo-mechanism can be substituted for the gearing and greater accuracy possibly obtained. Thus, it may be seen that the amount of movement of stylus 4 is a direct function of the RDF bearing data.

In addition to this stylus movement provided by the RDF, it also should be recalled that the RDF bearing data controls the movements of the data sheet which align the data sheet bearing index with the stylus, so as to record the correction on that aligned bearing. It, therefore, should be apparent that the amount of data sheet movement also is a direct function of the RDF bearing data, and, to permit the translating of this RDF data both for movement of the data sheet and for the controlling of the output of RDF data generator 7, dial-controlled mechanism, generally indicated by numeral 11, is geared both to generator 7 and to sheet 1, although here again the gearing could be supplanted by servo-mechanisms if desired. The mechanical details of this gearing will be considered shortly, and, for the present, it may be noted that it is so geared as to produce a data sheet movement that is equal to one degree linearly for each degree bearing change imposed on the dial-mechanism.

Figs. 3 and 4 illustrate the pertinent mechanical details. Referring to these drawings, it may be seen that data sheet 1 is mounted on a moveable platen 12 which, in turn, is supported for horizontal reciprocation on horizontal rollers 13 which have their bearings mounted in upper framework members 14 of a stationary box-like frame 15. Preferably, platen 12 is formed with depending lateral flanges which engage and are guided by vertical rollers 16, also mounted in bars 14, these rollers being employed to steady the moveable platen during its reciprocation. As shown, the platen is reciprocated by a gear drive that is meshed with a depending, centrally-located rack 17 rigidly secured to the base of the platen.

Within the confines of box-frame 15 are mounted selsyn generator 7 which, as stated, transmits RDF bearing data signals to differential motor 8, also mounted in the frame. Further, the frame is formed with various upright members that provide bearings for the gear driven and driving shafts to be described and also with a pair of spaced upright walls 18 and 19 that slidably support the stylus mechanism. The other selsyn generator 6 (used to transmit the visual bearing data signals) is mounted outside of frame 15 and in close proximity to the visual sighting telescope, although this generator, as well as generator 7, both are electrically connected to differential motor 8 so as to feed their signals into the motor.

The mechanism for obtaining and transmitting the visual bearing data to motor 8 is schematically shown in Fig. 1 and it is be believed that its details will be so obvious as to render minute description unnecessary. The data, of course, is obtained either by scope 2 or 2a, depending on which side of the ship's superstructure the target bears, and a generator 6 or 6a is provided for each scope. Preferably, scope 2, which will be used for descriptive purposes, is rotated or trained on its circling target by a small crank 21 having a worm-gear connection 22 to scope shaft 23, and, for a purpose to be later considered, shaft 23 is spring-loaded by means of a coil spring 24. Rotation, or training of the scope, of course, rotates shaft 23, which, in turn, is connected to shaft 26 of generator 6 by gears 27 and 28 so as to effect a certain setting of the generator for each bearing of the scope. As will be recalled, the setting of generator 6 effects a transmission of a certain strength to motor 8 and this signal is transmitted by an electrical circuit 29 which includes a selector switch 30 adapted to permit the use of scope 2a when desirable. Most suitably, the gear ratio between gears 27 and 28 is 36–1 so that, when scope 2 is trained through 360 degrees, generator 6 makes 36 revolutions, or one revolution for each 10 degrees of azimuth, this gearing conforming to the angular displacement effected in RDF generator 7 for each 10 degree increment of azimuth indicated by the RDF equipment. Generator 7 also is electrically connected to differential motor 8 by circuit 31 and, since generators 6 and 7 are electrically identical, equal changes in azimuth indicated and transmitted to the motor by both generators will produce no differential or motor drive. It is only when the RDF deviations result in untrue relative RDF bearings that a differential is translated into a motor drive to move stylus 4 a certain amount.

The drive for stylus 4 is accomplished by a pinion gear 32 mounted on the end of motor shaft 33 and meshed with a rack 34 rigidly borne by a slidable carriage 36 which carries the stylus. Carriage 36 is supported on guides, or rollers if desired, mounted on upright wall 18 and 19 of box-frame 15, and the bearing that drives it is such that one revolution of motor shaft 33 moves the carriage and the stylus linearly a distance of one-half inch along such a bearing of data sheet 1 as may be aligned with it. Since, as mentioned earlier, the chart or sheet is marked off with twenty lines to an inch and a degree to each line, the movement of one-half inch is equivalent to a linear movement of ten degrees over the sheet. With such an arrangement, and also recalling the fact that the angular displacement or drive of motor 8 is a function of the differences between the angular displacements of the shafts of generators 6 and 7, it may be seen that, if one of the generators is rotated ten degrees or one revolution more than the other, then differential motor will rotate one revolution to produce a movement equivalent to ten degrees of the stylus along its aligned bearing.

The drive for simultaneously setting RDF generator 7 and for moving platen 12 is illustrated in Figs. 1 and 4 and, as indicated, it is controllable by dial mechanism 11, this mechanism including a pair of superimposed dial cards 37, 38 and pointers 39, 41, that together provide vernier settings. Dial 37 is marked off in increments up to 10 so that one revolution of its pointer 39 is representative of an azimuth training rotation of 10 degrees. Dial 38, however, is representative of 360 degree azimuth rotation and one revolution of its pointer 41 represents a full sweep of the horizon. In the arrangement illustrated, both dial pointers are operated by knob 42, this knob being integrally connected to pointer 39 and directly driving a shaft 43 on which it is splined. Shaft 43, in turn, extends concentrically through a short shaft 44 and the drive of this short shaft is through a driving connection taken from inner shaft 43 by a splined pinion 46 meshed with a large gear 47 which is connected to outer shaft 44 through gears 48 and 49. In this manner, pointer 41 which is splined to shaft 44 is driven by and follows the rotation of knob 42.

Shaft 43 serves a double function of operating RDF generator 7 and of moving platen 12 and, as will be described, its geared connections are arranged to produce the results desired. As may be seen in Fig. 4, the shaft extends through the front panel of frame 15 and, interiorly of the frame it is supported in upright walls 53 and 54; a bevel gear 56 being splined onto it near wall 53 and a small gear 58 fixedly carried by it near wall 54. Bevel gear 56, as may be seen, is needed with a gear 59 mounted on the outer end of the shaft of generator 7, so that rotations of the knob are translated directly, or in a 1 to 1 ratio, to this generator. Thus, as can be surmised, a full rotation of knob 42, which is the equivalent of ten degrees change in azimuth, produces an equal rotation of the shaft of generator 7. As a result RDF bearings may be imposed on the generator by rotation knob 42 the desired amount and the generator in turn transmits to motor 8 a signal which is a function of the rotation of the knob. As may be recalled, generator 6 of scope 2 also is so driven that a ten degree change in the azimuth obtained visually is translated into one full rotation of its generator shaft and of motor 8. Consequently, the gearing arrangements of both the RDF and the visual generators are the same, so that motor energizations are only possible when one of the azimuth readings is not true and a differential is produced.

Small gear 58, which is found near wall 54, is used to drive or reciprocate platen 12 and its connections to the platen are through gears 61 and 62, gear 62 being meshed with platen rack 17 and the gear train being so designed as to move the platen and the data sheet mounted on it a distance of one-half inch for each full rotation or ten degree rotation of knob 42. This one-half inch, as will be recalled, represents ten degrees linearly along the abscissa axis of the pilot sheet.

The foregoing description should suffice for an understanding of most of the structure of the invention. The remaining functional elements principally are electrical in nature and their description, perhaps, can best be understood by considering the manner in which they affect and control the operation.

The calibration operation is carried out in the customary manner insofar as having a targetship provided with a transmitting antenna circle the ship being tested at a suitable distance. The visual sighting telescope is trained on the circling target at all times and radio bearings are taken at short intervals. The operator of the RDF is in complete control, and, to give him such control, he is provided with a push button switch 71 (Fig. 2), preferably of a pearl-button type adapted to be clasped in one hand, and also with a second stylus-operating push button switch 72 and an indicator "stand-up" light 73, both of these latter two elements being mounted on the front panel of apparatus frame 15 in a readily accessible position. When this operator is accurately trained on a bearing transmitted by the circling boat, he closes switch 71 momentarily, this closing acting to energize the coil of a solenoid switch 74 to close this switch and establish a circuit through line 76 to an electrically controlled brake 77 or 77a adapted when energized to arrest rotation of the shaft of selsyn generator 6 or 6a. Also, the closing of solenoid switch 74 energizes a retention circuit through another normally-closed solenoid switch 78 which causes switch 74 to remain closed to continue the generator arresting action of brake 77. At this point, it may be recalled that shaft 23 of scope 2 is spring-loaded by means of coil spring 24 and the function of this spring is to permit continued training of the scope when this brake has arrested the turning of the generator shaft to which the scope is geared. As may be expected, when the brake is released, the scope shaft resumes its normal position. The function of the brake, however, is one of the more important features. Briefly stated, it operates to hold the generator in the exact position that it was in when the RDF operator obtained his bearing and pressed his hand switch 71, so that generator 6 of the scope becomes fixed in a complementary position and continues to transmit to motor 8 a signal that is commensurate with the bearing of the scope when switch 71 was pressed. The primary purpose of this arrest is to provide the operator, or recorder, of the RDF dial mechanism 11 sufficient time to set his dials and feed into RDF generator 7 the bearing data of the obtained RDF bearing, as well as cause the desired movement of platen 12 to align the obtained RDF bearing with the stylus.

A further refinement which minimizes the chances of error is the provision of indicator light 73 which, as may be seen from the Fig. 2 circuit diagram, is caused to burn when solenoid switch 74 is closed. This is a "stand-up" light that alerts the recorder to the fact that a comparative reading is to be made. The RDF operator then may safely repeat to the recorder the RDF bearing obtained and, after the recorder has been given a moment to set his dials, the stylus can be caused to record the differential reading by closing push button switch 72.

Closing of switch 72 effects several operations almost simultaneously. Most important, it closes a circuit through a coil 79 which then electromagnetically attracts stylus 4 to draw its pen into recording contact with the plot sheet. Also, as is apparent from the circuitry of Fig. 2, closing of switch 72 energizes another coil 81, which opens normally-closed retention circuit switch 78, thereby opening the circuit to brake 77 to release generator 6 and also de-energize indicator 73.

The apparatus then has recorded its data on the plot sheet and its mechanism is prepared for another RDF bearing test. RDF bearings are, as stated, taken at short intervals so that the final result is a plotted curve for the full circle of the transmitting boat. As may be appreciated, the curve obtained is as accurate as mechanical connections will permit, and greater accuracy may be obtained by the use of servo-mechanisms. One very substantial improvement results from the elimination of the previously required close communication and coordination between the RDF and the visual operators. One skilled RDF operator has full control and any human errors should be traceable to his failure to exercise normal care.

The apparatus provided not only is far more accurate but, as should now be recognized, it can be made in a compact, convenient form which is simple and easy to operate, as well as being capable of providing its accurate, reliable correction data is a far shorter period of time than was possible by the use of prior procedures.

Obviously many modifications and variations of the present invention are possible in the light of the above teachings. It is, therefore, to be understood that within the scope of the appended claims the invention may be practiced otherwise than as specifically described.

I claim:

1. A method of determining variations between data obtained from a single source by separate receiving means, which includes operating the receiving means simultaneously to obtain data from the source at the same instant, moving a plot relative to an index point by an amount corresponding to the data received from the source at a given instant by one of said receiving means, and recording on the plot only the difference between the data obtained from the source at the same instant by all the receiving means, whereby the variation between the data obtained by the receiving means at a given instant may be determined.

2. A method of calibrating radio direction finding apparatus under actual operating conditions, which comprises tracking a target both visually and by radio signal, moving a tracking chart relative to a fixed index line by an amount corresponding to the data obtained by the radio signal tracking means, and recording on the chart relative to an index line normal to said first mentioned index line the difference between the radio signal and the visual bearing, whereby the difference between the radio signal equipment may be calibrated to correct the error between the radio signal and the visual bearing.

3. Apparatus for obtaining a recording of the summation of data received from a plurality of sources, said apparatus comprising a moveable platen for mounting a data sheet, a moveable stylus, manually controlled means provided at each source, means responsive to the movement of both said manually controlled means for effecting movement of said stylus relative to said data sheet by an amount representative of the summation of the data received at each source, and platen-moving means operated in response to actuation of the manual control means for one of said sources, whereby said platen is moveable to a position corresponding to the data received from only one of said sources and the stylus is moveable to a position corresponding to the summation of the data received from said plurality of sources.

4. Apparatus for obtaining and recording differences in data obtained from a single source by separate receiving means, said apparatus comprising a moveable platen for mounting a data sheet, a moveable stylus, an electric generator provided for each of said receiving means, mechanism for actuating each generator so that the output thereof corresponds to data obtained simultaneously from its respective receiving means, a differential motor arranged to be driven in response to a difference in said generator outputs, means actuated by said motor for moving said stylus, and means actuated by said mechanism provided for actuating one of said generators for moving said platen by an amount corresponding to the output of the generator associated therewith, whereby said data sheet is positionable with respect to said stylus in conformity with the difference in data received by said receiving means.

5. Apparatus for obtaining and recording the summation of data received from at least two sources, said apparatus comprising a movable platen for mounting a data sheet, a movable stylus, a generator provided for each of said sources, generator actuating means for setting the output of each generator in accordance with data received at its respective source, a differential motor driven by the output of said generators, means driven by said motor for moving said stylus an amount corresponding to the summation of the outputs of said generators, and means actuated by only one of said generator input means for moving said platen by an amount corresponding to the output of the generator associated therewith.

6. Apparatus for obtaining and recording the summation of data received from at least two sources, said apparatus comprising a movable platen for mounting a data sheet, a movable stylus, a generator provided for each of said sources, generator actuating means for setting the output of each generator in accordance with data received at its respective source, a differential motor driven by the output of said generators, means driven by said motor for moving said stylus an amount corresponding to the summation of the outputs of said generators, and means actuated by only one of said generator input means for moving said platen by an amount corresponding to the output of the generator associated therewith, and means for temporarily maintaining a constant output of one of said generators while permitting the continuous operation of its generator input means.

References Cited in the file of this patent

UNITED STATES PATENTS

| | | |
|---|---|---|
| 838,784 | Imlay | Dec. 18, 1906 |
| 994,677 | Hennah et al. | June 6, 1911 |
| 994,678 | Hennah et al. | June 6, 1911 |
| 1,187,234 | Barr et al. | June 13, 1916 |
| 2,502,991 | Rast et al. | Apr. 4, 1950 |
| 2,666,890 | Voll et al. | Jan. 19, 1954 |